(12) United States Patent
Carter et al.

(10) Patent No.: US 8,768,510 B2
(45) Date of Patent: Jul. 1, 2014

(54) SYSTEM AND METHOD FOR DIRECTING A ROBOTIC STORAGE SYSTEM

(75) Inventors: Joshua Daniel Carter, Lafayette, CO (US); Richard Douglass Rector, Arvada, CO (US)

(73) Assignee: Spectra Logic, Corporation, Boulder, CO (US)

( * ) Notice: Subject to any disclaimer, the term of this patent is extended or adjusted under 35 U.S.C. 154(b) by 676 days.

(21) Appl. No.: 13/008,701

(22) Filed: Jan. 18, 2011

(65) Prior Publication Data

US 2012/0185088 A1  Jul. 19, 2012

(51) Int. Cl.
  *G06F 7/00* (2006.01)
  *G11B 15/68* (2006.01)
  *G11B 17/22* (2006.01)

(52) U.S. Cl.
  CPC ............ *G11B 17/228* (2013.01); *G11B 15/689* (2013.01)
  USPC .......................................... 700/250; 709/212

(58) Field of Classification Search
  USPC .................. 700/250, 214; 711/111, 114, 161; 705/28; 709/212, 213, 201
  See application file for complete search history.

(56) References Cited

U.S. PATENT DOCUMENTS

| | | | | |
|---|---|---|---|---|
| 6,336,173 B1 * | 1/2002 | Day et al. | ....................... | 711/161 |
| 6,950,723 B2 * | 9/2005 | Gallo et al. | ................... | 700/214 |
| 6,999,960 B2 * | 2/2006 | Daily et al. | ........................... | 1/1 |
| 2010/0228916 A1 * | 9/2010 | Massey et al. | ................ | 711/115 |
| 2012/0066179 A1 * | 3/2012 | Saika | ............................ | 707/634 |

\* cited by examiner

*Primary Examiner* — Dalena Tran
(74) *Attorney, Agent, or Firm* — Kenneth Altshuler

(57) ABSTRACT

Provided is a system and method for a robotic storage system. The system includes at least a first and second portable data element and at least a first and second data read/write device, structured and arranged to read portable data storage elements. A repository is structured and arranged to store the first and second portable data storage elements. At least one robot is structured and arranged to move a selected data storage element between the repository and a selected data read/write device. The system includes a history of prior commands, each prior command executed by a prior path selected from a group of optional paths. A receiver is structured and arranged to receive a current command for the robotic storage system, and a director is structured and arranged to direct the robotic storage system based on the current command and the history. An associated method is also provided.

26 Claims, 5 Drawing Sheets

SYSTEM AND METHOD FOR DIRECTING A ROBOTIC STORAGE SYSTEM

CROSS-REFERENCE TO RELATED APPLICATIONS

None.

BACKGROUND OF THE INVENTION

1. Field of the Invention

The present invention relates generally to systems and methods for data storage, and more specifically to systems and methods for directing a robotic storage system.

2. Description of Related Art

Robotic storage systems, also referred to as robotic storage libraries, have been a staple in digital mass storage for backup and server applications. More specifically they are commonly used to archive data, i.e., store data that is not immediately needed by a host computer. When a host computer needs the data, the robot storage system acts to retrieve and provide the needed data.

Within the robotic storage system, data is archived on physical long term storage media, such as, for example, tape. When a request is received for data, the robotic storage system identifies the physical long term storage media containing the specified data and a robot transport mechanism is dispatched to retrieve the long term storage media and provide it to a data transfer interface that is capable of establishing a communication path between the storage media and the requesting host computer.

One example of a robotic storage system is a tape cartridge library. In a tape cartridge library, there are typically a plurality of shelves structured to at least temporarily store a tape cartridge. In some instances, the tape cartridges are themselves stored in movable packs that are themselves temporarily stored on shelf structures. The tape library may have more than one drive for reading data from and writing data to the tape media within the tape cartridge. Further, the library may have more than one robot operating within the library to transport tape cartridges between the storage shelves and the read/write drives.

Various manufacturers build and deploy substantially identical storage systems to different geographic locations and for different clients. In many cases, these systems emply internally moving parts, such as for example a robot and a tape cartridge. As physical movement is an inherent characteristic of such systems, the time involved in responding to a host computer request can be a factor in overall storage system performance.

Because different clients may have different needs, schemes for controlling a robotic storage system in one environment may or may not be effective in a second environment. Further still, the needs imposed by one set of host computers may vary from day to day or even hour to hour for one robotic storage system but be relatively constant for another robotic storage system.

In some cases, robotic storage system maintenance is a desired function from time to time. While clearly desirable for long term health and operation of the robotic storage system, it is, nevertheless, a task that should not interfere with host computer requests. Moreover, the desirable times for maintenance, and potentially the type of maintenance, can vary widely from one robotic storage system to another.

It is to innovations related to this subject matter that the claimed invention is generally directed.

SUMMARY OF THE INVENTION

Embodiments of this invention provides a system and method for data storage, and more specifically to systems and methods of directing a robotic storage system.

In particular, and by way of example only, according to one embodiment of the present invention, provided is a method for directing a robotic storage system, including: receiving a current command for the robotic storage system; receiving a history of the robotic storage system; and directing the robot storage system based on the current command and the history.

In another embodiment, provided is a method for directing robotic storage system response, including: receiving a current command for the robotic storage system; receiving a history of prior commands, each prior command executed by a prior path selected from a group of optional paths; for the current command, performing a review of the history to determine a first prior path of a first prior command selected from the prior commands essentially matching the current command; simulating at least a subset of first optional paths for the first prior command; comparing the paths to determine a selected path; and implementing the selected path for the current command.

In yet another embodiment, provided is a self directing robotic storage system, including: at least a first and second portable data storage element; at least a first and second data read/write device, structured and arranged to read portable data storage elements; a repository structure and arranged to store the first and second portable data storage elements; at least one robot structured and arranged to move a selected data storage element between the repository and a selected data read/write device; a history of prior commands, each prior command executed by a prior path selected from a group of optional paths; a receiver structured and arranged to receive a current command for the robotic storage system; and a director structured and arranged to direct the robotic storage system based on the current command and the history.

Further still, in yet another embodiment, provided is a self directing robotic storage system, including: means for receiving a current command for the robotic storage system; means for receiving a history of the robotic storage system; and means for directing the robot storage system based on the current command and the history.

BRIEF DESCRIPTION OF THE DRAWINGS

At least one system and method of data storage will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific of system or method of data storage, or specifically data storage for virtual machines. Thus, although the instrumentalities described herein are for the convenience of explanation shown and described with respect to exemplary embodiments, it will be understood and appreciated that the principles herein may be applied equally in other types of systems and methods of data storage.

Figure 1:
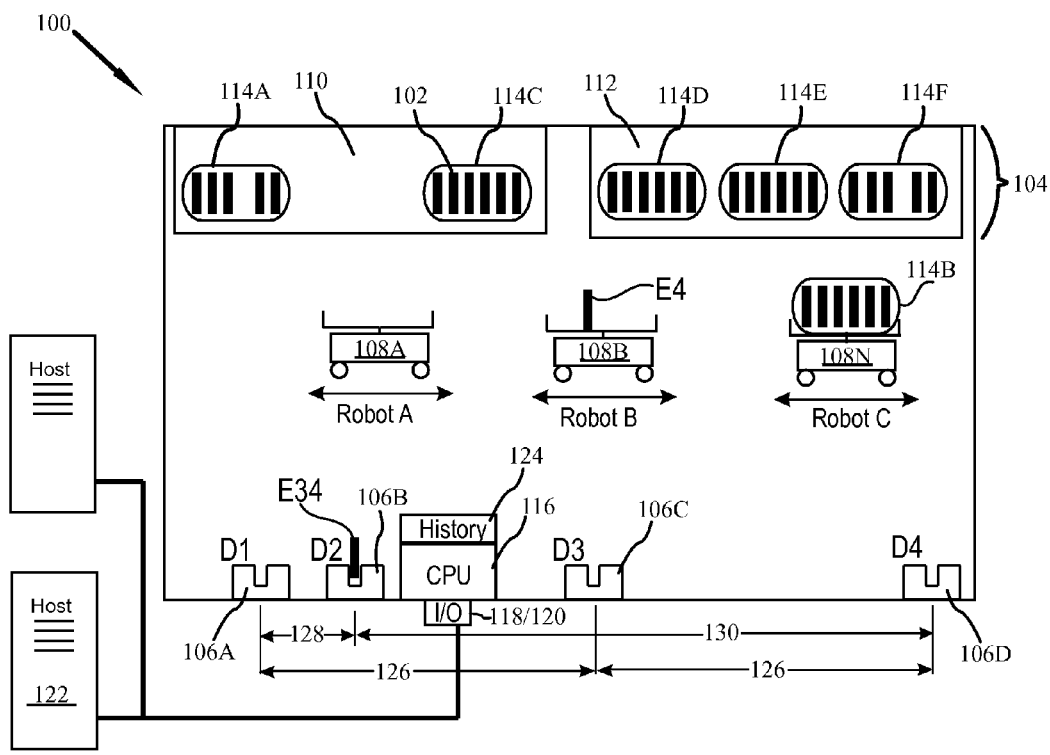
FIG. 1 illustrates a high level block diagram of a robotic storage system in accordance with at least one embodiment.

Turning now to the drawings, and more specifically FIG. 1, illustrated is a high-level block diagram of a robotic storage system ("RSS") 100 in accordance with at least one embodiment. As a general overview, RSS 100 comprises a plurality of data elements "data elements" 102, a repository 104 structured and arranged to store the data elements 102, at least one data read/write devices 106, and at least one robotic transfer device, or simply robot 108 used herein, operable to move data elements 102 between the repository 104 and a data read/write device 106.

More specifically, the repository 104 is structured and arranged to provide a plurality of storage locations of which locations 110 and 112 are exemplary. These storage locations 110 and 112 are capable of holding the data elements 102 while they are not in robotic transport or otherwise engaged with a read/write device 106. In at least one embodiment, the repository 104 and more specifically the storage locations 110 and 112 are provided by a shelf system.

In at least one embodiment, data elements 102 are temporarily stored in portable collectors 114, of which portable collectors 114A~114F are exemplary. Although capable of operating with only one robot (in one embodiment), RSS 100 has been illustrated with a plurality of robots 108A, 108B and 108C, each operable to transport a data element 102 and/or a portable collector 114 containing a desired data element 102 from the repository 104 to a specified data read/write device 106, of which data read/write devices 106A~106D are exemplary. It is understood and appreciated that in optional embodiments RSS 100 may possess more read/write devices 106 or fewer read/write devices 106. Likewise, the specific number of robots 108 may vary between embodiments.

A read/write device 106, as used herein, is considered to be a device that forms a cooperating relationship with a data element 102 such that data can be written to and received from the data element 102 as the data element 102 serves as a mass storage device. Moreover, in at least one embodiment a read/write device 106 as set forth herein is not merely a socket device and a cable, but a tape drive that is adapted to receive tape cartridges, a disk drive docking station which receives a disk drive adapted for mobility, a disk drive magazine docking station, a compact Disc (CD) drive used with a CD, a Digital Versatile Disc (DVD) drive for use with a DVD, a compact memory receiving socket, mobile solid state devices, etc . . . .

RSS 100 typically has a central processing unit ("CPU') 116 coupled to a receiver 118, such as input/output device 120, permitting RSS 100 to receive current commands. The current commands may, in one instance, be from at least one host computer 122 regarding read/write access of data to one or more data elements 102. In another instance, these current commands may be self generated, such as for example the performance of maintenance operations, the pre-staging of a robot 108 to a certain location within RSS 100, or other such operation that originates as a command from within RSS 100 as opposed to a command from a remote host. RSS 100 also has a history 124 of prior commands. Moreover, the CPU 116 is operable as a director structured and arranged to direct the RSS 100 based on the current command and the history 124.

With respect to RSS 100 and specifically the data elements 102, it is understood and appreciated that data elements 102 may comprise, a tape, a tape cartridge, an optical disc, a magnetic encoded disc, a disk drive a memory stick, memory card or any other tangible data storage device suitable for archival storage of data within RSS 100. Further, portable collectors 114 may comprise tape packs, tape drive packs, disk packs, disk drive packs or other structures suitable for temporarily storing subsets of the data elements 102. It is further understood and appreciated that the data elements 102 are structured and arranged to be moved within RSS 100, sometimes frequently.

More specifically, the data elements 102 are intended to be physically moved from the storage locations 110 and 112 to a read/write device 106. As such, the data elements 102 are not engaged with a system bus on a permanent basis, which may alleviate associated costs of power consumption, dedicated interface hardware for each data element 102, increased management of system resources, and the like. Indeed as the data elements 102 transported by a robot 108, it is also appreciated that the movement of data elements 102 within RSS 100 is in sharp contrast to the movement of a read/write head from a rest position to a position adjacent to a data sector on a rotating disc. Moreover, RSS 100 advantageously permits a conservation of resources for embodiments where physical mobility of the data elements 102 is desired. This is in contrast to a storage system where each and every device, such as a magnetic hard drive, is plugged into a system bus so as to be available without physical movement of the data element 102 from a storage location, e.g., location 110 to a read/write device 106.

As exemplified in the present RSS embodiment, a command from a host computer 122 to move portable data element "E5 to Drive 3, Process and Return" is a command that may be executed in a number of different ways. For simplicity and ease of illustration and discussion, only the first part "E5 to Drive 3", or rather "E5 to D3" is considered. Even with such simplification the options for execution are many—E5 itself can be moved, E5 and its portable collector 114 can be moved, and the move may be performed by robot 108A, 108B or 108C. Further, although D3 is specified, there are in the illustrated example four read/write devices 106, of which D3 is specified to be 106C.

Figure 2:
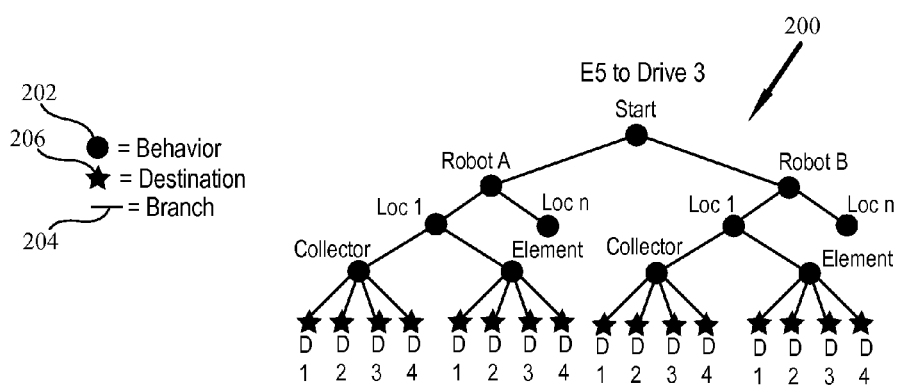
FIG. 2 illustrates a matrix of optional plausible paths for commands of at least one embodiment.

Moreover, the execution of a command can be described as a path. FIG. 2 is presented to conceptually illustrate the matrix 200 of at least a subset of the various path options that exist for the command "E5 to D3." As used herein, the term "matrix" is understood and appreciated to refer to an arrangement of connected things. Decision matrix in particular can be represented in a variety of different ways, such as for example a decision tree. Moreover, the use of the term matrix as applied to the depiction of path options is intended to be understood broadly, such that tables, charts, maps, tree or other structures for relating behaviors and choice branches. Decision trees are employed herein for ease of illustration and discussion.

More specifically, a path for a command is defined by a series of behaviors illustrated as dots "●" 202, having a choice of branches shown as lines 204, leading various destinations, shown as stars "★" 206. The more behaviors and the more choices of branches, the more complex the various path options may be. Moreover, a behavior 202 is a point at which a decision is made, the choice of branches representing the options available at the point of decision. For ease of illustration and discussion, the examples as set forth and described herein have been developed with simplified set of behaviors and choices of branches.

For the present example, behaviors 202 encompass actions, such as, for example, Start, select Robot A 108A, select Robot B 108B, go to shelf #1, e.g. storage location 110, go to shelf N, e.g. storage location 112, get data element 102, get portable collector 114, go to read/write device 106A~106D. Behaviors 202 may also include actions, such as, remapping a read/write device 106 to logically appear as a different read/write device 106. In other words, behaviors may be physical or logical. Indeed even with a relatively simple set of behaviors 202 for a given command, such as, the portion "E5 to D3" there are a large number of optional paths.

With respect to FIG. 1, each portable collector 114 is shown to have capacity for six data elements 102. Numbered from left to right with six apparent portable collectors 114, there is capacity for thirty-six data elements 102 in the exemplary illustration of RSS 100. It is further apparent that E5 is a data element 102 that is a member of the subset stored in portable collector 114A (E5 being the fifth element based on the left to right numbering as stated above, E4 being shown as currently disposed with robot B 108B) disposed upon storage location 110.

As such, behaviors to select a storage location other than location 110, a portable collector other than portable collector 114A or even a portable data element other than data element E5 are implausible as they would not result in successful execution of the specified current command. When, as shown in FIG. 2, the branches 202 are divided into plausible and implausible classes (following further branches from Location N, not shown), the plausible branches still yield twenty-four different optional paths. Of course, different embodiments providing different options and/or different choices of branches associated with each behavior may yield greater or fewer optional paths.

Figure 3:
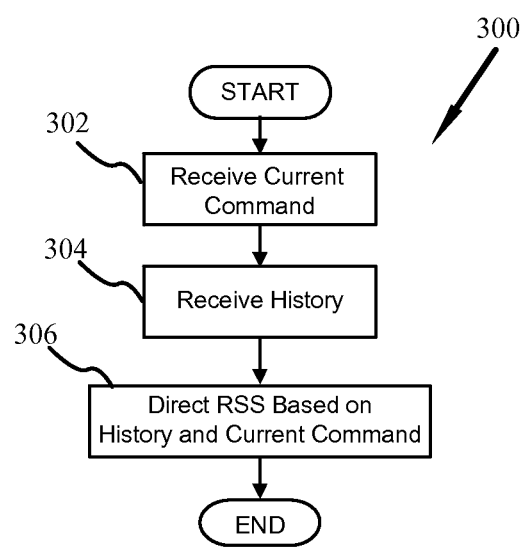
FIG. 3 is a high level flow diagram of a method for directing the storage system in accordance with at least one embodiment.

FIG. 3 conceptually illustrates a high level flow diagram depicting at least one method 300 for how RSS 100 advantageously self directs for a current command, such as, for example, "E5 to D3". More specifically, the current command is received, block 302. The history of RSS 100 is also received, block 304. The RSS 100 is then directed based on the history and the current command, block 306.

In other words, how RSS 100 responds to a current command is based upon how RSS 100 has responded to a similar command in the past. Further, not only can RSS 100 review the history to determine the prior path for a prior command essentially matching the current command, RSS 100 can also advantageously virtualize prior optional paths that could have been taken and so evaluate the effectiveness of multiple prior path. As such, although identical RSS 100 systems may be deployed in different environments, as the history of each RSS will likely be different, each will individually and advantageously adapt. More specifically, a global strategy to improve operation is not required.

Figure 4:
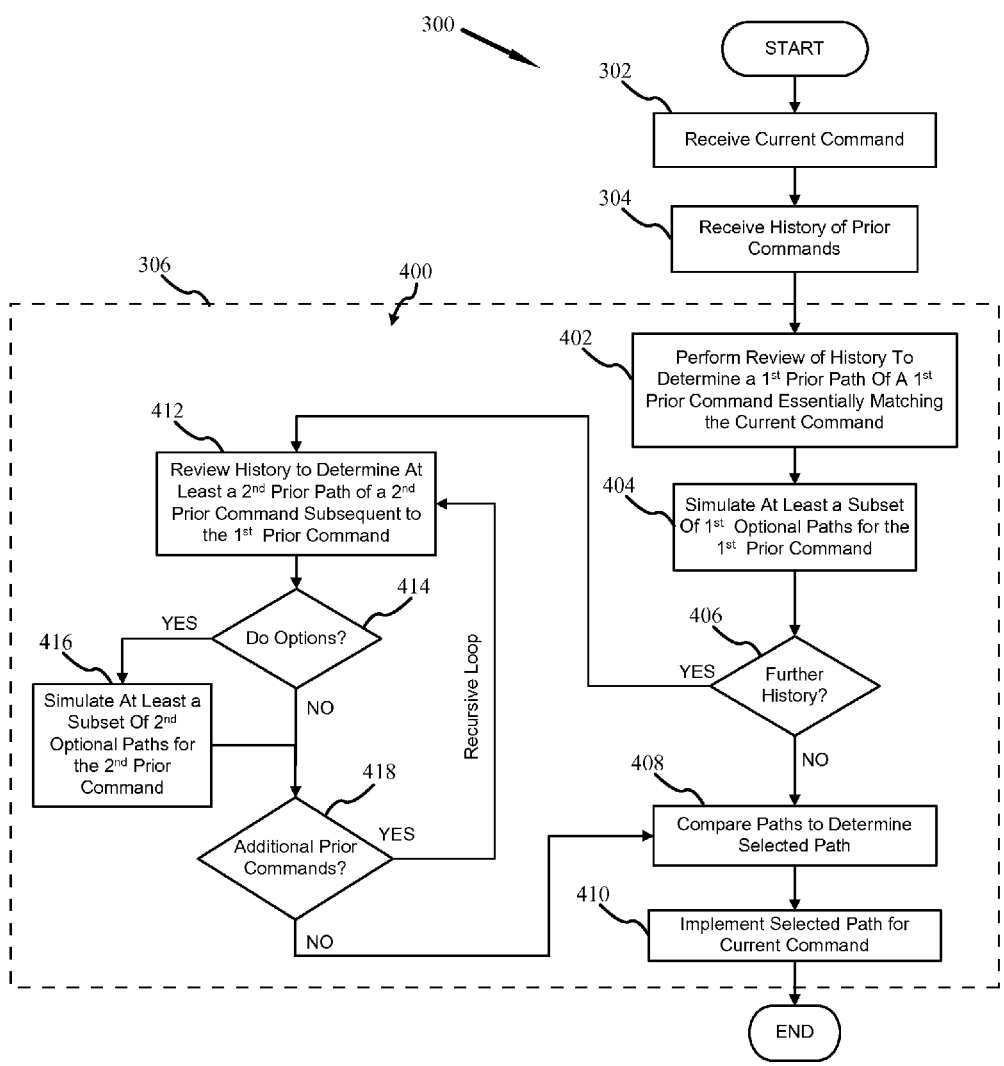
FIG. 4 is a refined flow diagram presenting refined detail of a portion of the method shown in FIG. 3.
Figure 5:
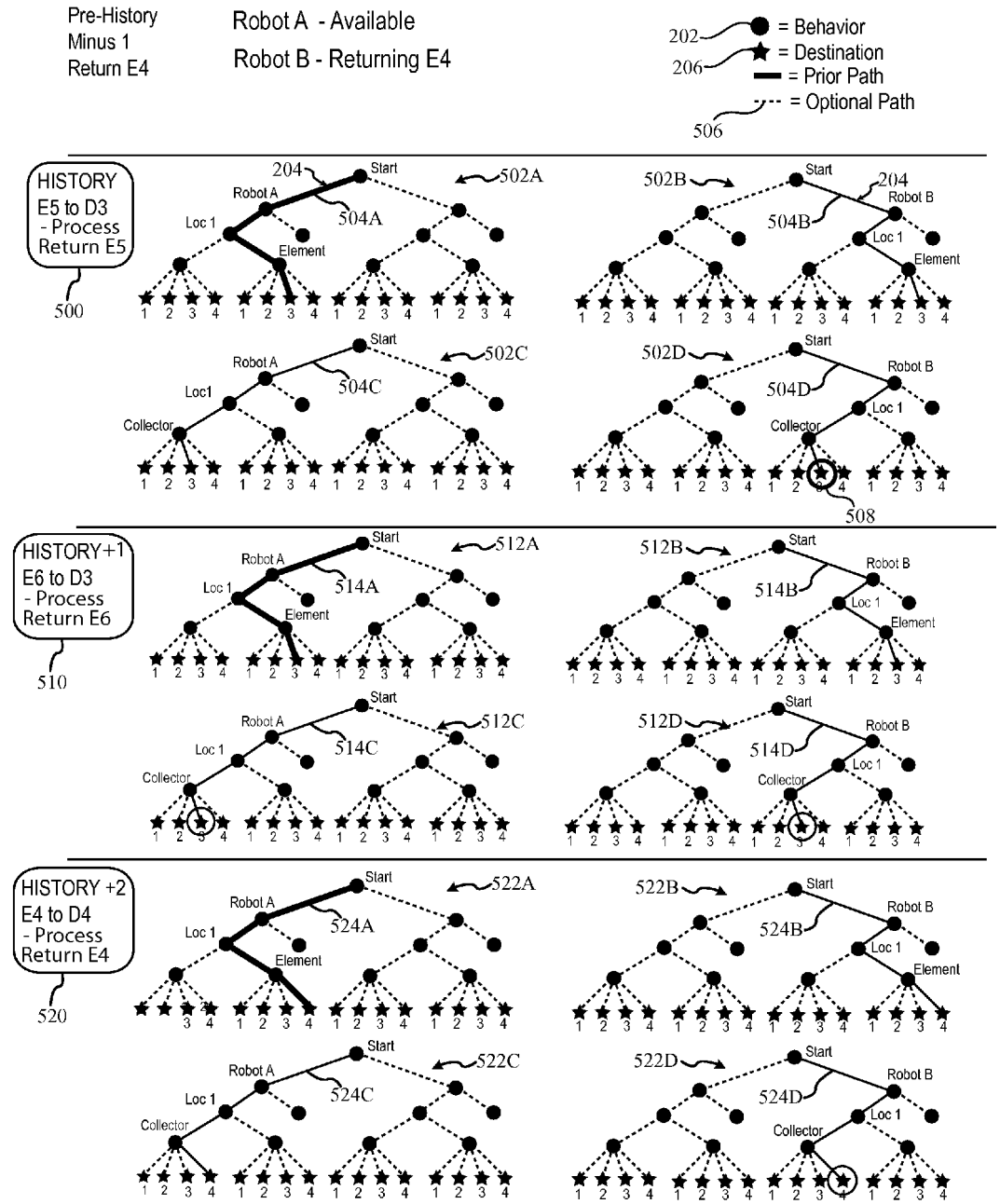
FIG. 5 illustrates matrix histories for prior commands essentially matching a current command in accordance with at least one embodiment.
Figure 6:
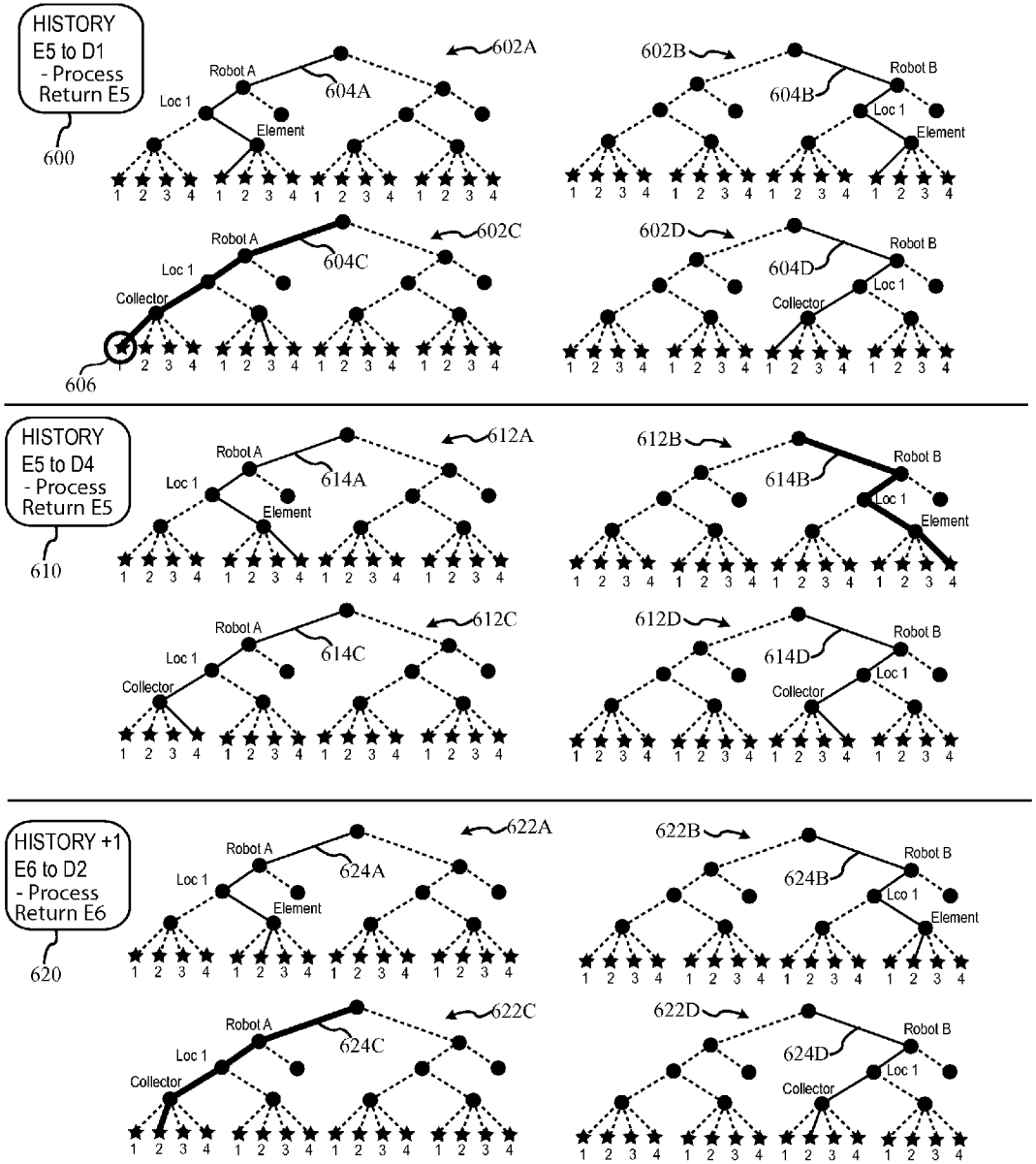
FIG. 6 illustrates matrix histories for prior commands essentially matching an adjusted current command in accordance with at least one embodiment.

FIG. 4 in connection with FIGS. 5 and 6 provides a more detailed flow diagram with conceptual illustrations depicting in greater detail method 300 for RSS 100. It will be appreciated that the described method need not be performed in the order in which it is herein described, but that this description is merely exemplary of one method for directing RSS 100.

In at least one embodiment, method 300 commences with the receiving of a current command, block 302. In at least a first instance the current command is a self-generated command, such as, for example, a command for a maintenance operation. In a second instance the current command is received from a host computer 122. Moreover, in varying embodiments, the current command is selected from the group consisting of; rest, perform maintenance, respond to a host request, move a robot 108 to a designated location, and combinations thereof.

For the purposes of this example, the current command is taken to be from host computer 122 and specifies at least a data element 102 and a destination. More specifically, the command for this example is "E5 to D3, Process, Return" understood as "provide portable data element 5 to read/write device 3, process and then return data element 5 to the repository."

For ease of illustration and discussion, this current command is simplified to be "E5 to D3." Other commands will be described herein following similar logic. As shown in FIG. 5, in general RSS 100 is aware of the current state. For example, just prior to the receipt of the current command, e.g., time interval minus 1, the state of RSS was Robot A 108A available, Robot B 108B returning E4.

In at least one embodiment, the current state of RSS 100 is received in conjunction with a current command, and may, therefore, be considered to be a component of the current command. In at least one alternative embodiment, the current state of RSS 100 is an internal condition continuously monitored and, therefore, always known by default. More specifically, as RSS 100 is directing the movement of at least one robot 108, at least one data element 102, and at least one read/write device 106, RSS 100 has direct awareness of its internal condition, as in where each data element 102 is, where each robot 108 is and the state of each read/write device 106, etc . . . . The information regarding the internal condition may be maintained in whatever form is most suitable to the embodiment of RSS 100, such as for example a table, in active memory, as a cache file, etc . . . .

As stated above, the history is also received, block 304. Indeed the history may be received from a local database, an external database or other memory store when RSS 100 is powered up, or otherwise received or retrieved in specific response to the receipt of a new current command. In varying embodiments, the history may be received or otherwise retrieved from a system adapted to direct or assist in directing RSS 100. Likewise, once received, in at least one embodiment, the received history remains available to RSS 100 during continued operation. In varying embodiments appropriate to different RSS 100 configurations, the history is retained in a buffer, non-volatile storage, cache, CPU cache, etc . . . . Again, as noted above, the history comprises a history of prior commands, each prior command executed by a prior path selected from a group of optional paths. Also, for purposes of this description and meaning of the claims, the term "non-transitory memory" means a tangible data storage device, including non-volatile memories (such as flash memory, disk drives, and the like) and volatile memories (such as dynamic random access memory and the like). Computer instructions either permanently or temporarily reside in the non-transitory memory, along with other information such as user data, virtual mappings, operating systems, applications, and the like that are accessed by a computer processor to perform the desired functionality. The term "non-transitory memory", or just "memory" expressly does not include a transitory medium such as a carrier signal, but the computer instructions can be transferred to the memory wirelessly.

It is also to be understood that the history is additive, not static. In other words, when a new command is received and a path determined therefore, that command and it associated path are added to the history as a new prior command and a prior path. In this way the history of commands and their associated paths continues to evolve. As the history may indeed become large over time, in varying embodiments the extent of the history can be adjusted.

More specifically, in at least one embodiment the entire history is reviewed for each and every new command. In at least one alternative embodiment, the portion of the history that is reviewed is adjustable. This adjustment may be based on time, number of prior commands or other characteristic. Indeed in at least one embodiment, the variability of how much history shall be considered is based at least in part, but not limited to, the type of current command received, the origin of the current command, the priority of the current command, the current state of RSS 100, the current time, and/or combinations thereof. Moreover, the history as utilized for one current command, may be different from the history utilized for a different current command.

Directing RSS 100, as indicated by block 306 in FIG. 3, is now described for at least one embodiment in refined detail 400. Moreover, a review of the history is performed to determine a first prior path of a first prior command selected from the prior commands essentially matching the current command, block 402.

As shown in in FIG. 5, a first prior command essentially matching the current command has been identified at history 500. For ease of illustration and discussion, the history 500 of the first prior command does indeed match the current command. Matrix 502A illustrates the first prior path 504A of the first prior command. As in FIG. 2, each path has a series of behaviors 202 having a choice of branches 204. A behavior 202 is a point at which a decision is made, the choice of branches representing the options available at the point of decision.

More specifically, the first behavior 202 is "Start." A choice of branches 204 lead from "Start" to either Robot A as in matrix 502A or to Robot B as in matrix 502B. A subsequent behavior 202 can be direct Robot A as in matrix 502A along the branch to Location 1 (e.g., "Loc 1"), or Robot B as in matrix 502B along the branch to Location 1 (e.g., "Loc 1"). Directing either Robot A or Robot B to any other location is not a viable option and therefore is not illustrated. At behavior "Loc 1", the choice of branches lead either to selecting the Element as in matrix 502A or selecting the Collector as matrix 502C. The branches 204 selected between the various behaviors 202 define a path. As is clearly illustrated, the first prior path 504A is defined by a selected set of branches, the optional paths shown as dotted lines 506, defined by the unselected branches.

Having identified a first prior command and its associated first prior path 504A, the refined detail 400 continues by simulating at least a subset of first optional paths for the first prior command, block 404.

In FIG. 5 these simulations are illustrated by matrix 502B, 502C and 502D, each illustrating a simulated first optional path 504B, 504C and 504D respectively, for the first prior command.

Continuing with the refined detail 400, decision 406 queries as to whether further history should be considered. If the decision is "no," refined detail 400 proceeds to compare the paths, e.g. first prior path 504A and first optional paths 504B, 504C and 504D to determine a selected path. More specifically, the paths (the prior path and the simulated optional paths) are compared based on one or more factors, such as the speed of one robot with respect to another, the time required to complete each path, the total distance of the path within RSS 100, the power consumed in the course of the path, priorities of various elements and other factors.

Moreover, in at least one embodiment, comparing the paths is based on at least one factor selected from the group consisting of time, speed, power, priority and combinations thereof. Further, in at least one embodiment, a most recent past command can be used to determine a weighting factor that may be applied to at least one prior path in determining the selected path.

Having determined a selected path, the selected path is then implemented for the current command, block 410. In short, the review of history to determine a first prior path 504A and first optional paths 504B~D associated with a first prior command essentially matching the current command permits an advantageous determination of a path for the current command.

This advantageous determination of a path for the current command can be further refined and improved by a further review of additional history. In other words, determining a path for the current command may be enhanced by taking into consideration what is likely to happen next? For example, where at decision 406 the decision is "Yes," refined detail 400 proceeds to review the history to determine from the prior commands at least a second prior path for a second prior command subsequent to the first prior command, block 412.

With respect to FIG.5, the second prior command is illustrated at history 510. It is further understood and appreciated that the second prior command may be the very next command occurring after the first prior command (e.g., History+1) or a subsequent command selected at an adjustable interval. Further still, in at least one embodiment, the second prior command is determined statistically as the next most likely command based on the overall history. For example, in at least one embodiment the history may reveal that there are one hundred instances of the prior command E5 to D3. Of those one hundred, for eighty of them the next prior command is E6 to D3, for nineteen of them the next prior command is E27 to D4, and for one of them the next prior command is E9 to D1. Statistically, the odds of the next prior command being E6 to D3 are significantly greater than either E27 to D4 or E9 to D1.

As illustrated, the second prior command is illustrated to be "E6 to D3, Process, Return E6." Matrix 512 conceptually simplifies this second prior command to "E6 to D3."

Matrix 512A illustrates the second prior path 514A of the second command as previously executed. In decision 414 of refined detail 400, a decision is made as to whether second optional paths of the second prior command should be considered. For a decision of "Yes," the refined detail 400 continues by simulating at least a subset of second optional paths for the second prior command, block 416.

In FIG. 5 these simulations are illustrated by matrix 512B, 512C and 512D, each illustrating a simulated second optional path 514B, 514C and 514D respectively for the second prior command. With the simulations complete, the refined method continues with decision 418 asking if additional prior commands are to be considered. For a decision of "No," the refined detail 400 returns to compare the paths (the prior paths and the simulated optional paths) to determine a selected path, block 408.

In this comparison it is appreciated that optional second paths 514C and 514D are both likely to be advantageous over the other paths. The basis for this can be understood with respect to FIG. 1. In FIG. 1, portable collector 114A is shown to hold both portable data elements E5 and E6, as they are the fifth and sixth data elements 102 based on the left to right numbering as stated above. As the first prior command is simplified to be "E5 to D3" and the second prior command is simplified to be "E6 to D3", clearly paths that involve moving the entire portable collector 114A are likely to be preferable to paths moving the portable data elements individually. In other words, when the entire portable collector is moved for the first prior command, then execution of the second prior command is dramatically simplified because the portable collector with the next requested data element is already present at D3.

With respect to FIGS. 1, 4 and 5, at this point in the example it is likely that a selected path involving moving the portable collector 114A is preferred to path options moving portable data elements individually. Continuing with the review of history may further improve the determination of a selected path.

More specifically, a recursive loop can be invoked at decision 418 by opting to review additional prior commands from the first prior command to the current command. As shown in FIG. 5, the next second prior command (e.g., History+2) is "E4 to D4, Process, Return E4". Again, the determination of this subsequent prior command may be based on incremental review or other basis. In at least one embodiment, the determination of the subsequent command is based on statistical evaluation. Matrix 522 conceptually simplifies this next second prior command to "E4 to D4".

Matrix 522A illustrates the next second prior path 524A of the next second command as previously executed. In decision 414 of refined detail 400, a decision is made as to whether optional paths should be considered. For a decision of "Yes," the refined detail 400 continues by simulating at least a subset of optional paths for the next second prior command, block 416.

In FIG. 5 these simulations are illustrated by matrix 522B, 522C and 522D, each illustrating a simulated second optional path 524B, 524C and 524D respectively for the next second prior command.

Taken as a collective whole, a review of the prior paths now demonstrates that while either robot A 108A or robot B 108B could be tasked to perform the current command, the review of history indicates that RSS 100 will likely be called upon to execute the command simplified as "E4 to D4" after the current command. As is shown in FIG. 1, at the time the current command is received, robot B 108B is returning E4.

A weighting factor may be determined based on the state of robot B 108B, and applied to prior paths involving robot B 108B. In light of the weighting factor being applied to prior paths involving robot B 108B, an advantageous benefit may be realized. Permitting Robot B 108B to complete the return of E4, determining path 504D as the selected path 508 selecting and implementing the selected path 508 for the current command may advantageously improve RSS 100 performance, as Robot B 108B will have the portable collector 114A and be advantageously positioned to quickly fulfill the next two likely commands, e.g., "E6 to D3" and "E4 to D4".

This recursive review of history can be performed for some or all of the intervening commands between the first prior command and the current command. In addition, in at least one embodiment, the review of history further includes reviewing the time between prior commands. Trends may, therefore, be identified, such as, a benefit delaying a return of a data element 102 or portable collector 114 in light of the history demonstrating a subsequent command involving the same data element 102 or portable collector 114.

The review of history for directing RSS 100 can also be advantageous for other situations, such as where a read/write device 106 is inoperable, or the history of commands suggests a better course of path options. The review of history can also determine a selected path for a current command, which is essentially matched by a prior command (as in the prior command being slightly different in some way from the current command). Such advantageous ability to adapt the history of prior commands for the implementation of a current command may be further understood with respect to the following example.

Returning to FIG. 1, data element E34 is illustratively shown to be cooperating with read/write device D2 106B. The relative distance 126 between read/write device D1 and D3 (106A and 106C) is illustratively shown to be about the same relative distance 126 between read/write device D3 and D4 (106C and 106D). The relative distance 128 between read/write device D1 and D2 (106A and 106B) is considerably less then the relative distance 130 between read/write device D2 and D4 (106B and 106E).

FIG. 6 presents another set of prior path matrixes. For this example, the current command is simplified to be "E5 to D3". However, for this example, it is understood that read/write device 106C, i.e., D3, is inoperable. As such, RSS 100 must complete the current command by moving E5 to a different read/write device 106, which in turn is logically remapped to appear to the host computer 122 as D3. As D2 is currently occupied, the options are for D1 or D4.

Moreover, the current command can be adjusted within RSS 100 to be either "E5 to D1, Remap as D3" or "E5 to D4, Remap as D3." History 600 is determined as a first prior command for "E5 to D1." For History 600, matrix 602C illustrates the first prior path 604C and matrixes 602A, 602B and 602D illustrate the first optional paths 604A, 604B and 604D for the first prior command "E5 to D1."

Similarly, for history 610, matrix 612B illustrates the first prior path 614B and matrixes 612A, 612C and 612D illustrate the first optional paths 614A, 614C and 614D for the first prior command "E5 to D4."

Recursively reviewing additional subsequent history as set forth in the above description of refined detail 400, in this example, it is determined that the next subsequent command is likely to be "E6 to D2, Process, Return E6", shown as history 620. For ease of discussion, this is simplified as "E6 to D2". Matrix 622C illustrates the second prior path 624C and matrixes 612A, 612B and 612D illustrate the second optional paths 624A, 624C and 624D for the second prior command.

For purposes of this example, E34, shown in FIG. 1, initially intended to be engaged with D2, is now presumed to have been returned to portable collector 114F as time has advanced forward. As such, read/write device D2 is now available.

As the relative distance 128 between D1 and D2 is significantly less than the relative distance 130 between D4 and D2, prior paths involving D1 are evaluated to be preferred over prior paths involving D4. Further prior paths involving the portable collector 114A containing both E5 and E6 are evaluated to be preferred over prior paths involving only the portable data element E5. Lastly, in this example, as robot A 108A is currently available and robot B 108B is still completing a prior task, prior paths involving robot A are preferred over prior paths involving robot B.

Moreover, for this example, prior path 604C is determined as the selected path 606 and implemented for the current command now modified to be "E5 to D1, Remap as D3". It should further be appreciated that with respect to determining a selected path, the distinction as a prior path vs. the distinction as a prior optional path may be substantially irrelevant. Indeed, the historical relationships between paths and the weighting factors that may be applied to one or more paths are likely to be of greater value in determining a selected path then whether the selected path was actually an implemented prior path.

It is also understood and appreciated that although the above descriptions and accompanying figures have been illustratively shown with a limited number of behaviors and a limited number of branches therebetween, in varying embodiments RSS 100 and method 300 may further employ many more possible behaviors and many more branches. Indeed, as the number of possible behaviors increase and the number of branches associated therewith also increase, the complexities of the resulting matrix options also increase. The ability to review the prior paths and optional paths may be performed rapidly and without appreciable delay to the host computer 122, yet with the advantageous ability to provide enhanced direction of RSS 100 and to fulfill the current command as provided by the host computer 122.

It should also be appreciated that the review of history can accommodate such issues as different time frames, such as evenings as opposed to daytime, weekdays as opposed to weekends, and even which host computers are providing the current commands. Moreover, based on the history 124, RSS 100 and method 300 are advantageously adaptable in substantially real time to determine a selected path for a current command based on wide range of factors that can be quickly adjusted and/or even changed from one current command to the next.

With respect to the above discussion and accompanying illustrations, it is understood and appreciated that RSS 100 may be established in any number of configurations without departing from the scope of the present invention.

In one commercial example of an RSS 100 system is the T-Finity Robot Transport System manufactured by Spectra Logic Corp., of Boulder Colo. The T950 robotic transport units, i.e. robots 108A, 108B, 108N, traverse the T-Finity library along a track system and a cartridge picker device (not shown) moves vertically via an elevator system integrated with each robot transport unit. The cartridge picker device is adapted to grasp mobile storage elements from a shelf system or from a drive to be moved within the T-Finity Robot Transport System via the associated robotic transport unit. The cartridge picker device is further capable of disposing a mobile storage element to the shelf system or to a drive.

In the illustrative embodiments, the robots 108 merely provide transportation of the data elements 102 from the repository 104 to a read/write device 106. For a commercial system, such as the T-Finity, the robots 108 may provide the added feature of depositing a data elements 102 on a shelf, e.g. location 110 or 112, and/or loading the data elements 102 in a cooperating relationship with a drive such that data can be read to and written from the data elements 102 via the drive. In optional configurations, a loading feature can reside with each drive as opposed to a cartridge picker device integrated with a robotic transport unit.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method to position a robotic transporter in a tape library, the method comprising:
providing said tape library comprising: a plurality of tape cartridges, a plurality of tape drives, a shelf system wherein said tape cartridges are disposed in an array, a central processing unit, said robotic transporter adapted to move to each location in said array;
said library receiving a first move instruction to move a first tape cartridge from a first location in said shelf system to a first tape drive;
moving said first tape cartridge from said first location in said shelf system to said first tape drive via said robotic transporter;
transferring said first tape cartridge to said first tape drive via said robotic transporter;
said central processing unit evaluating historical move instructions retained in non-tansitory memory of at least two previous move instructions that were completed before said first move instruction;
from said historical move instructions, predicting that a second move instruction will select a second tape cartridge from a second location in said central processing unit; and
positioning said robotic transporter to said second location after said transferring step, but before receiving said second move instruction.

2. The method of claim 1 wherein said second location is essentially in a place that said robotic transporter can access a second tape cartridge.

3. The method of claim 1 wherein said tape library further comprises a plurality of portable collectors, each of said portable collectors is adapted to hold a plurality of said tape cartridges, said portable collectors are disposed in said shelf system, in said moving step, said first tape cartridge is disposed in a first collector and said robotic transporter moves said first collector to said first tape drive, said second tape cartridge is in said first collector and said second location is to hold said first collector near said first tape drive.

4. The method of claim 1 wherein said second location is a specific location in said shelf system.

5. A method to position a robotic transporter in a library between move instructions, the method comprising:
providing said library comprising a plurality of portable collectors wherein each of said portable collectors contains a plurality of tape cartridges, a shelf system that supports said plurality of said portable collectors, a plurality of tape drives, a first robotic transporter, a central processing unit, non-transitory memory, a first historical move record retained in said non-transitory memory of a first tape cartridge moving from a first location to a first tape drive and back to said first location, a second historical move record retained in said non-transitory memory of a second tape cartridge moving from a second location to a second tape drive and back to said second location, and a third historical move record retained in said non-transitory memory of a third tape cartridge moving from a third location to a third tape drive and back to said third location;
said library receiving a fourth move instruction to move said first tape cartridge to said first tape drive;
positioning said robotic transporter in a first access position at said shelf;
withdrawing a first portable collector containing said first tape cartridge from said first shelf system via said robotic transporter;
moving said first portable collector to said first drive via said robotic transporter;
loading said first tape cartridge in said first tape drive via said robotic transporter;

reviewing said first, said second and said third historical move instructions in said central processing unit;
after said reviewing step, predicting via said central processing unit that a fifth move instruction will be to move said second tape cartridge to either said second tape drive or said third tape drive;
positioning said robotic transporter in a second access position that is ready to access said second tape cartridge;
parking said robotic transporter in said second access position until said second move instruction is received.

6. The method of claim 5 wherein said second tape cartridge is in said first portable collector and said second access position is to hold said first portable collector by said second tape drive, wherein said second tape drive is more likely to be in said fifth move instruction.

7. The method of claim 5 wherein said second tape cartridge is in said first portable collector and said second access position is to hold said first portable collector between said second tape drive and said third tape drive.

8. The method of claim 5 wherein said second tape cartridge is in a second portable collector located at a specific location in said shelf system and said access position is essentially at said specific location.

9. A method to position a robotic transporter in a tape library, the method comprising:
providing a tape library comprising a plurality of tape cartridges, a shelf system that supports said plurality of tape cartridges, a first and a second tape drive, at least one robotic transporter, a central processing unit, and non-transitory memory;
evaluating, via said central processing unit, a plurality of historical move records, retained in said non-transitory memory, wherein each of said move records contains which one of said tape cartridges was moved to either said first or said second tape drive via said first robotic transporter;
predicting via said central processing unit what next tape cartridge is going to be chosen when a new move instruction is received based on said evaluating step;
positioning said first robotic transporter in a position to grasp said next tape cartridge;
holding said first robotic transporter in said position until said new move instruction is received.

10. The method of claim 9 wherein said tape library further comprises a plurality of portable collectors, each of said portable collectors holds at least two of said tape cartridges, said portable collectors are stored in said shelf system in an array.

11. The method of claim 10 wherein said next tape cartridge is in a first portable collector located at a first position in said shelf system and said position to grasp said next tape cartridge is at said first position.

12. The method of claim 10 wherein said next tape cartridge is in a first portable collector already being held by said first robotic transporter in a first position at said first tape drive and said position to grasp said next tape cartridge is at said first position.

13. The method of claim 9 wherein said shelf system further possesses a plurality of slots wherein each of said tape cartridges is disposed in an array.

14. The method of claim 13 wherein said next tape cartridge is in a first slot of said plurality of slots and said position to grasp said next tape cartridge is at said first slot.

15. The method of claim 9 wherein said historical move records are retained in physical active memory, which is either a disk drive or solid state memory disposed in and accessible by said tape library.

16. The method of claim 9 wherein said evaluating and said predicting steps are accomplished via a central processing unit of said library.

17. The method of claim 9 wherein said historical move records includes a first and a second host, said predicting step is further based on predicting which of said hosts is likely to request said new move instruction.

18. The method of claim 9 further comprising receiving said new move instruction to move said next tape cartridge to said first tape drive; moving said next tape cartridge to said first tape drive via said first robotic transporter; loading said next tape cartridge in said first tape drive; adding said new move instruction to said historical move records; predicting via said central processing unit what new next tape cartridge is going to be chosen when a new next move instruction is received based on said evaluating step; positioning said first robotic transporter in a new position to grasp said new next tape cartridge; holding said first robotic transporter in said new position until said new next move instruction is received.

19. A method comprising:
providing a tape library comprising a plurality of tape cartridges, a first and a second tape drive, at least one robotic transporter, a central processing unit, and non-transitory memory;
after moving a first tape cartridge to said first tape drive via said robotic transporter and loading therein, moving said robotic transporter to a predicted position in said tape library to move a second tape cartridge to said second tape drive via a second move instruction, said central processing unit determines said predicted position, which is based on a prediction from other previous instructions, retained in said non-transitory memory, to move one of said tape cartridges to either said first or said second tape drive;
holding said robotic transporter in said predicted position at least until receiving said second move instruction.

20. The method of claim 19 wherein said other previous instructions is comprised of only instructions moving one of said tape cartridges to one of said tape drives.

21. The method of claim 19 wherein said other previous instructions include formerly moving said first tape cartridge to said first tape drive immediately followed by moving said second tape cartridge to said second tape drive.

22. The method of claim 21 wherein said other previous instructions include formerly moving a third tape cartridge to said first tape drive immediately following moving said second tape cartridge to said second tape drive; after moving said second tape cartridge to said second tape drive based on said second move instruction, predicting, via said central processing unit, from said other move instructions that a third move instruction will be received next to move said third tape cartridge, and moving said robotic transporter in a new location to access said third tape cartridge and holding said robotic transporter in said new location, at least until receiving said third move instruction.

23. The method of claim 19 wherein said tape library comprises a plurality of portable tape collectors wherein each collector holds at least two of said plurality of tape cartridges, wherein said first tape cartridge and said second tape cartridge are both from a first portable tape collector and said robotic transporter already holding said first portable tape collector, said predicted position is to hold said robotic transporter at said first drive or at said second drive.

24. The method of claim 19 wherein said second tape cartridge does not include a previously used tape cartridge.

25. The method of claim 19 wherein said predicted position is based on said second move instruction wherein said second move instruction does not include a previously selected tape cartridge.

26. The method of claim 19 wherein said predicted position is further based on time to select said second tape cartridge, speed to select said second tape cartridge, power to select said second tape cartridge, priority of selecting said second tape cartridge, and a combination thereof.

* * * * *